US009619848B2

(12) United States Patent
de Castro et al.

(10) Patent No.: US 9,619,848 B2
(45) Date of Patent: Apr. 11, 2017

(54) TECHNIQUES TO DETERMINE SETTINGS FOR AN ELECTRICAL DISTRIBUTION NETWORK

(71) Applicant: SAS Institute Inc., Cary, NC (US)

(72) Inventors: Arnulfo D. de Castro, Durham, NC (US); Glenn Lampley, Raleigh, NC (US); Xinmin Wu, Cary, NC (US); Greg Link, Cary, NC (US)

(73) Assignee: SAS Institute Inc., Cary, NC (US)

( * ) Notice: Subject to any disclaimer, the term of this patent is extended or adjusted under 35 U.S.C. 154(b) by 388 days.

(21) Appl. No.: 14/270,589

(22) Filed: May 6, 2014

(65) Prior Publication Data
US 2014/0330441 A1    Nov. 6, 2014

Related U.S. Application Data

(60) Provisional application No. 61/819,907, filed on May 6, 2013, provisional application No. 61/900,666, filed
(Continued)

(51) Int. Cl.
*G05D 3/12* (2006.01)
*G06Q 50/06* (2012.01)
(Continued)

(52) U.S. Cl.
CPC .............. *G06Q 50/06* (2013.01); *H02J 3/12* (2013.01); *H02J 3/1821* (2013.01);
(Continued)

(58) Field of Classification Search
None
See application file for complete search history.

(56) References Cited

U.S. PATENT DOCUMENTS

2007/0096840 A1*  5/2007  Williams, III .......... H03L 7/099
                                                    331/179
2010/0198422 A1*  8/2010  Feng ..................... H02J 3/1828
                                                    700/291
(Continued)

Primary Examiner — Adam Lee

(57) ABSTRACT

Techniques to determine settings for an electrical distribution network are described. Some embodiments are particularly directed to techniques to determine settings for an electrical distribution network using power flow heuristics. In one embodiment, for example, an apparatus may comprise a model reception component, a forecast component, and an optimization component. The model reception component may be operative to receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator. The forecast reception component may be operative to receive a forecast for demand on the electrical distribution network. The optimization component may be operative to receive the model capacitor banks and model voltage regulators and determine one or more settings for the multiple capacitor banks and multiple voltage regulators that allow for providing power within predetermined limits while reducing power loss as compared to a power loss of the existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis. Other embodiments are described and claimed.

27 Claims, 13 Drawing Sheets

Related U.S. Application Data on Nov. 6, 2013, provisional application No. 61/900,713, filed on Nov. 6, 2013.

(51) Int. Cl.
*H02J 3/12* (2006.01)
*H02J 3/18* (2006.01)
*H02J 3/00* (2006.01)

(52) U.S. Cl.
CPC ... *H02J 2003/003* (2013.01); *H02J 2003/007* (2013.01); *Y02E 40/30* (2013.01); *Y02E 40/76* (2013.01); *Y02E 60/76* (2013.01); *Y04S 10/54* (2013.01); *Y04S 10/545* (2013.01); *Y04S 40/22* (2013.01)

(56) References Cited

U.S. PATENT DOCUMENTS

| | | | | |
|---|---|---|---|---|
| 2012/0022713 A1* | 1/2012 | Deaver, Sr. | ............ | G05B 17/02 700/298 |
| 2014/0277599 A1* | 9/2014 | Pande | ................ | G06Q 50/06 700/22 |

* cited by examiner

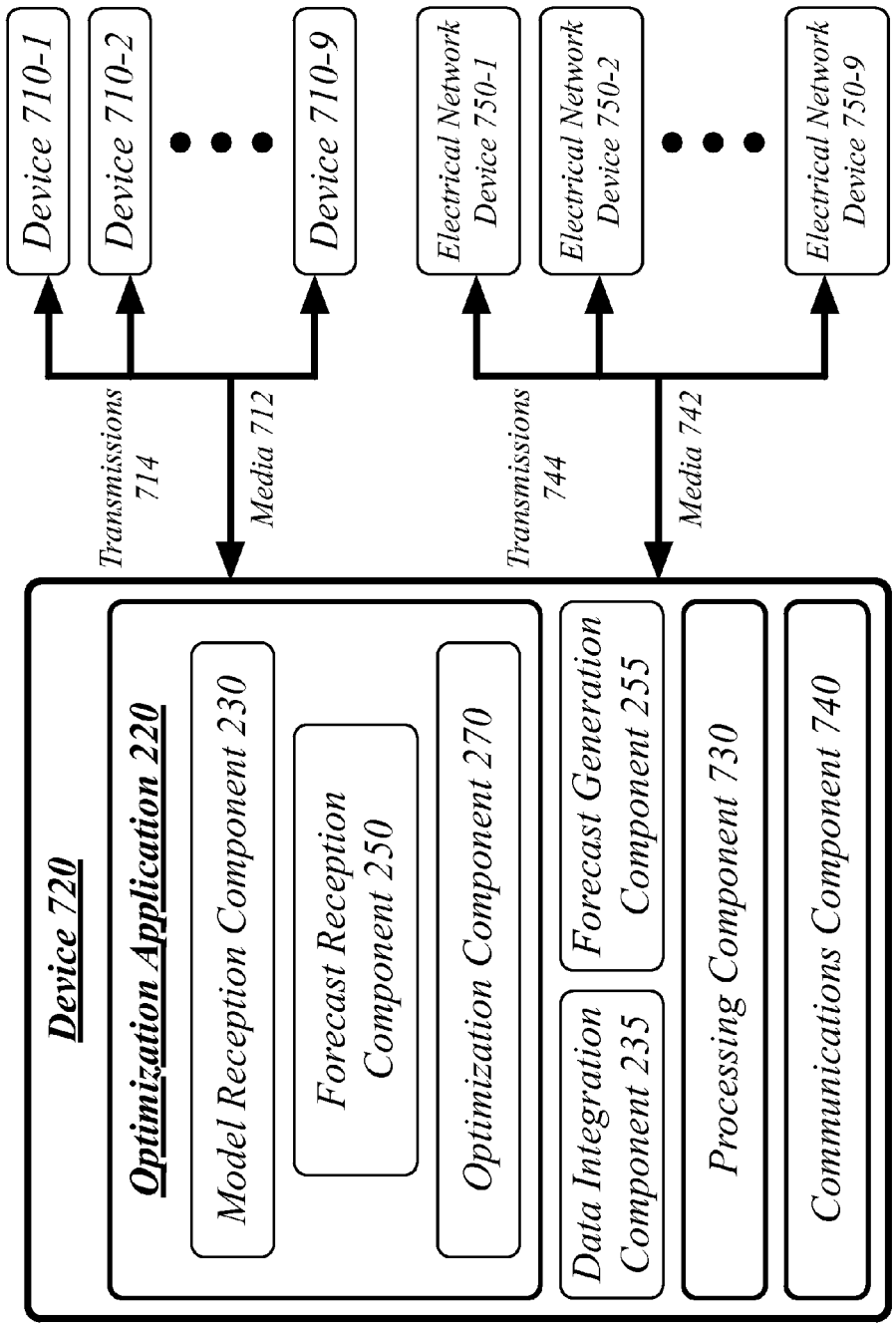

900

Receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator.
902

Receive one or more existing settings for the multiple capacitor banks and multiple voltage regulators of the electrical distribution network.
904

Receive a forecast for demand on the electrical distribution network.
906

Determine one or more settings for the multiple capacitor banks and multiple voltage regulators that allow for providing power within predetermined limits while reducing power loss as compared to a power loss of the existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis.
908

*FIG. 9*

TECHNIQUES TO DETERMINE SETTINGS FOR AN ELECTRICAL DISTRIBUTION NETWORK

RELATED APPLICATIONS

This application claims the benefit of priority under 35 U.S.C. §119(e) to U.S. Provisional Patent Application No. 61/819,907, titled "Methods for Mixed-Integer Non-Linear Optimization of Distribution Systems," filed on May 6, 2013, which is hereby incorporated by reference in its entirety. This application additionally claims the benefit of priority under 35 U.S.C. §119(e) to U.S. Provisional Patent Application No. 61/900,666, titled "Power Flow Heuristic for Volt-Var Optimization," filed on Nov. 6, 2013, which is hereby incorporated by reference in its entirety. This application additionally claims the benefit of priority under 35 U.S.C. §119(e) to U.S. Provisional Patent Application No. 61/900,713, titled "Power Flow Heuristic for Volt-Var Optimization," filed on Nov. 6, 2013, which is hereby incorporated by reference in its entirety.

BACKGROUND

Electrical power distribution may be distinguished as providing transport over radial and interconnected networks. Radial networks spread outwards from a station without interconnection to other supplies. Each node receiving electrical power through a radial distribution network uniquely receives power from a single power station and that power is transmitted through only a single path in the distribution network. Radial distribution networks may be particularly common in rural areas, which are served by long distribution lines serving a sequence of isolated areas. Interconnected networks contains interconnections between lines of distribution. A node receiving electrical power through an interconnected distribution network may receive or be able to receive power from two or more power stations and may receive or be able to receive power transmitted through more than one path in the distribution network. Interconnected networks may be particularly common in urban areas, which are served by dense distribution networks with multiple points of interconnection.

Power flow study, also known as load-flow study, is the application of numerical analysis to a power system to analyze it in normal steady-state operation. The goal of a power flow study is to obtain complete voltage angle and magnitude information for each bus in a power system for specified load and generator real power and voltage conditions. Once this information is known, real and reactive power flow on each branch as well as generator reactive power output can be analytically determined. Due to the nonlinear nature of this problem, numerical methods are employed to obtain a solution that is within an acceptable tolerance. A three-phase power flow study is usually applied to distribution systems where the three-phases are not balanced and have to be modeled independently.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to determine settings for an electrical distribution network. Some embodiments are particularly directed to techniques to determine settings for an electrical distribution network using power flow heuristics. In one embodiment, for example, an apparatus may comprise a model reception component, a forecast component, and an optimization component. The model reception component may be operative to receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator. The forecast reception component may be operative to receive a forecast for demand on the electrical distribution network. The optimization component may be operative to receive the model capacitor banks and model voltage regulators and determine one or more settings for the multiple capacitor banks and multiple voltage regulators that allow for providing power within predetermined limits while reducing power loss as compared to a power loss of the existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an example of a centralized system for the prediction and optimization system of FIG. 2.

FIG. 9 illustrates an example of a third logic flow for the prediction and optimization system of FIG. 2.

DETAILED DESCRIPTION

Figure 1:
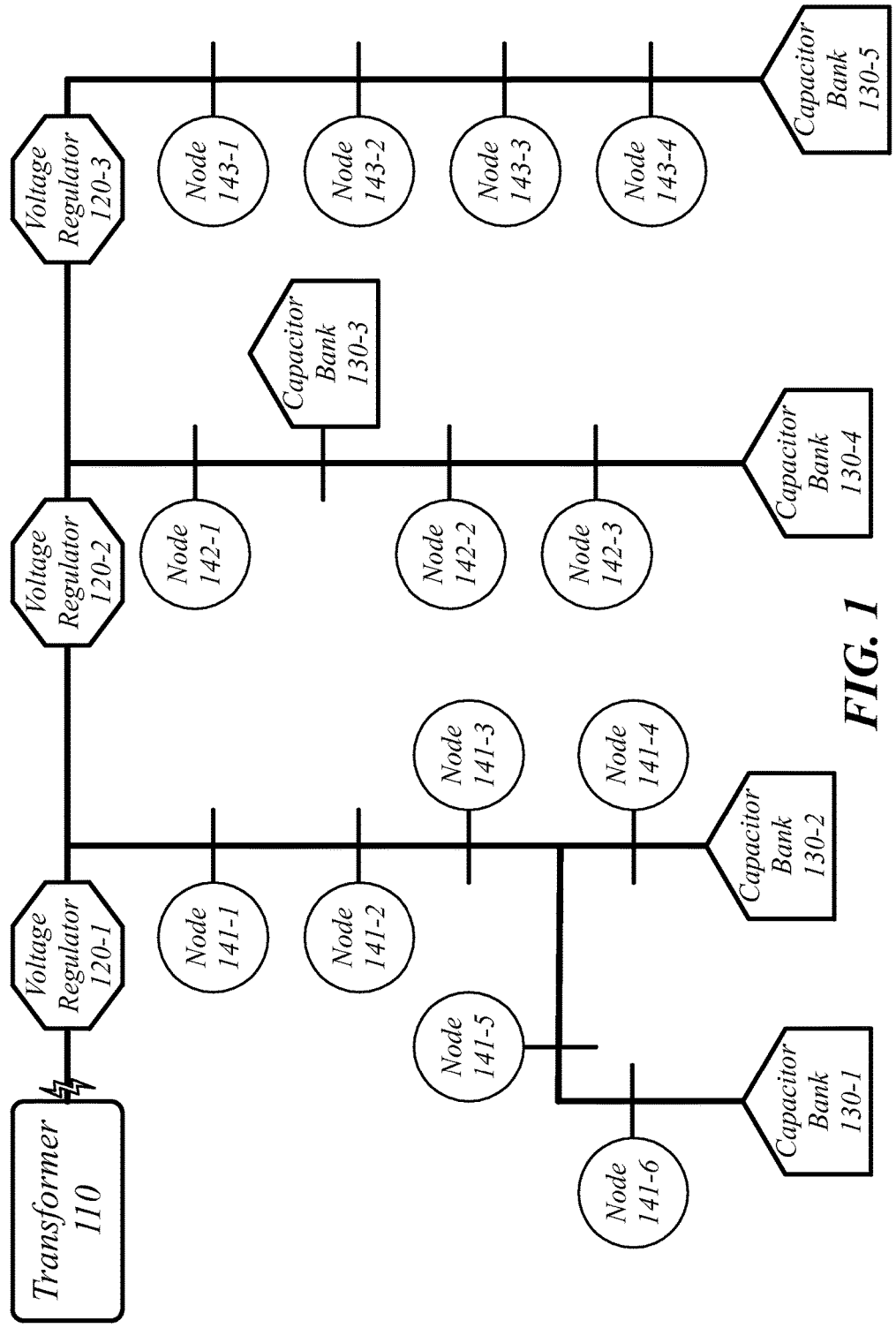
FIG. 1 illustrates an example operating environment for a system to determine settings for an electrical distribution network.

The optimization of the different aspects of distribution system operations may be performed independently of each other. Separate solutions may address device switching for voltage and device switch for reactive volt-ampere (volt-VAR) control. Separate approaches may be used for load control and demand response. Similarly, distributed resources, such as wind and solar generation and energy storage, may be addressed separately. Solving the combined problem is particularly difficult because it is a large, non-linear optimization problem involving discrete control variables. However, the techniques herein model the distribution network as an integrated system and solve the resulting mixed-integer non-linear optimization problem for operations over a time horizon.

The process of solving the combined problem may begin with the integration of data, continue through to the optimization or device switching, and continue through the results being implemented. Data integration incorporates features of network modeling to define the system admittance in a hierarchical network manner. A forecasting process generates load and source forecast based on history and the variable nature of both loads and sources; this includes mathematical models of the energy conversion and economic characteristics generation and storage resources, and electrical characteristics, consumption profiles and response patterns of the different loads. The optimization process may solve the network model using non-linear optimization and heuristic techniques to find an optimized schedule of distributed generation sources and discrete device settings. Finally, the system may allow the operator to make adjustments to the determined settings then rerun load flow based on these changes to capture overall system savings. This process may occur across all feeders connected to a common bus, creating a large model that offers a more complete solution to the configuration of an electrical distribution network.

The power delivered to a distribution network is measured in terms of real power, identified in watts (W), and apparent power, identified in volt-amperes reactive (VAR). To optimize the operation of a distribution network, the objectives are to manage voltage and capacitance such that the lowest level of real and apparent power is being provided without violating any voltage constraints (Conservation Voltage Reduction), and to manage voltage and capacitance such that the lowest level of losses are produced without violating any voltage constraints (Loss Minimization). When utilizing a non-linear programming (NLP) solver, there are instances where a local optima is found but the result does not satisfy the optimal solution. The enclosed techniques attempt to avoid finding local optima by providing the NLP solver with a starting point that is closer to the optimal solution, and it can also be used independently to quickly find a near-optimal solution.

The enclosed techniques utilize least squares load flow equations to solve two basic objectives: Conservation Voltage Reduction (CVR) and Loss Minimization (LM). Conservation Voltage Reduction utilizes the operation of switchable devices on the electric distribution network to control voltage in such a manner as to reduce the power demand of the network. Studies by the Electric Power Research Institute (EPRI) and the Northwest Energy Efficiency Alliance have shown that by reducing the voltage on a distribution network, the power demand required by the electrical network can be reduced as well. As a result, the embodiments can improve affordability, scalability, and ease of operation of an electrical distribution network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example operating environment 100 for a system to determine settings for an electrical distribution network.

It is worthy to note that "a" and "b" and "c" and similar designators as used herein are intended to be variables representing any positive integer. Thus, for example, if an implementation sets a value for a=3, then a complete set of voltage regulators 120-*a* may include voltage regulators 120-1, 120-2, and 120-3. The embodiments are not limited in this context.

On a typical distribution network, voltage is controlled by the operation of the voltage regulators and capacitors located in distribution substations and along the distribution feeders. An example distribution network is shown in FIG. 1 which includes three voltage regulators 120-*a* and five capacitor banks 130-*b*. The voltage regulators 120-*a* and the capacitor banks 130-*b* are used to maintain customer voltage to within the local regulatory limits. Nodes 141-*c*, 142-*d*, and 143-*e* are in a radial layout, receiving power from transformer 110 via a unique path. For example, node 142-2 receives power from transformer 110 via the unique path through voltage regulator 120-1, voltage regulator 120-2, and past the capacitor bank 130-3. A node may be described as being associated with the voltage regulator from which it is immediately downstream. As such, nodes 141-c are all associated with voltage regulator 120-1. Nodes 142-*d* are all associated with voltage regulator 120-2. Nodes 143-*e* are all associated with voltage regulator 120-3. A node may be described as being in a section with all the other nodes associated with a same voltage regulator. As such, nodes 141-*c* are in a first section associated with voltage regulator 120-1, nodes 142-*d* are in a second section associated with voltage regulator 120-2, and nodes 143-e are in a third section associated with voltage regulator 120-3.

As electrical power moves through the electrical distribution network, different voltages may be received at each of the nodes 141-*c*, 142-*d*, and 143-*e*. The voltage regulators 120-*a* and capacitor banks 130-*b* will be used to adjust these voltages received at each of the nodes 141-*c*, 142-*d*, and 143-*e* to maintain them within predetermined limits, which will typically correspond to regulatory limits for electrical distribution. Because all of the elements of the electrical distribution network past the transformer 110 are electrically interconnected, changes to any of the voltage regulators 120-*a* or capacitor banks 130-*b* change the voltage seen at any of the nodes 141-*c*, 142-*d*, and 143-*e*. As such, when considering different configurations of the voltage regulators 120-*a* or capacitor banks 130-*b*, changes made at any one will be incorporated into the analysis of the others, with these effects accumulating the more changes are considered. For example, if the optimization process concludes that voltage regulator 120-3 should have its settings changed, this settings change will be incorporated into the analysis for deciding how to configure voltage regulator 120-2. If the optimization process also results in a settings change for voltage regulator 120-2, the settings changes for voltage regulator 120-3 and voltage regulator 120-2 will both accumulate when voltage regulator 120-1 is being considered.

Figure 2:
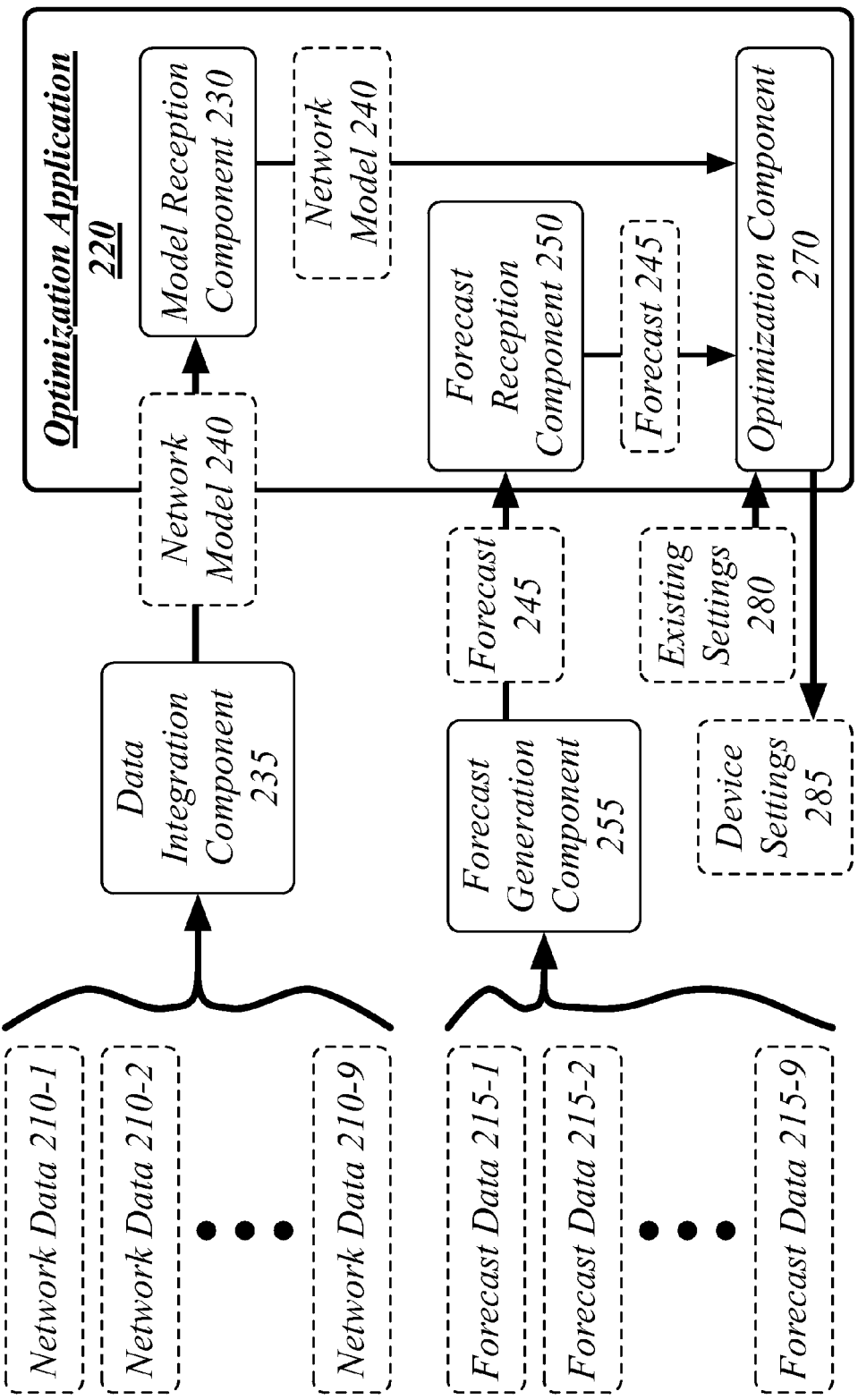
FIG. 2 illustrates an example of a prediction and optimization system to determine settings for an electrical distribution network.

FIG. 2 illustrates a block diagram for a predication and optimization system 200. In one embodiment, the prediction and optimization system 200 may comprise a computer-implemented system having a software optimization application 220 comprising one or more components. Although the prediction and optimization system 200 shown in FIG. 2 has a limited number of elements in a certain topology, it may be appreciated that the prediction and optimization system 200 may include more or less elements in alternate topologies as desired for a given implementation.

The prediction and optimization system 200 may comprise the optimization application 220. The optimization application 220 may be generally arranged to receive a network model 240, a forecast 245, and existing settings 280 for the electrical distribution network and to produce device settings 285 proposing one or more changes to the settings of voltage regulators and capacitor banks that are predicted to reduce power loss as compared to a power loss of the existing settings 280 or reducing power usage as compared to a power usage of the existing settings 280.

The application 220 may comprise a model reception component 230. The model reception component 230 may be generally arranged to receive a network model 240 of an electrical distribution network having multiple capacitor banks 130-*b* and multiple voltage regulators 120-*a*, each of the multiple capacitor banks 130-*b* represented in the network model 240 by a model capacitor bank, each of the multiple voltage regulators 120-*a* represented in the network model 240 by a model voltage regulator, the electrical distribution network having a radial layout in which power flows from a source to multiple nodes 141-*c*, 142-*d*, 143-*e* in which each node is associated with one voltage regulator of the multiple voltage regulators 120-*a*. Each node is considered to be associated with the voltage regulator from which it is immediately downstream, even though, as discussed with reference to FIG. 1, each node is affected by the settings of all the multiple voltage regulators 120-*a*.

The model reception component 230 may receive the network model 240 from a data integration component 235. The data integration component 235 may receive network data 210-*f* describing the layout of the electrical distribution network and produce the network model 240 using the received network data 210-*f*. It will be appreciated that in some embodiments the data integration component 235 may be part of or otherwise distributed with the optimization application 220 and that in other embodiments the data integration component 235 may be separate from optimization application 220. For example, in some embodiments, the data integration component 235 may be provided by a first software provider and the optimization application 220 by a second software provider, with interoperability between the two configured as part of the installation of the optimization application 220.

The optimization application 220 may comprise a forecast reception component 250. The forecast reception component 250 may be generally arranged to receive a forecast 245 for demand on the electrical distribution network. The forecast 245 may be specific to the particular date and period of time for which the optimization of the electrical distribution network is being performed. The forecast 245 may be received on-demand immediately prior to the performance of the optimization, may be received each day at the start of the day or at some other preset time, or according to any other schedule.

The forecast reception component 250 may receive the forecast 245 from a forecast generation component 255. The forecast generation component 255 may receive forecast data 215-*g* describing various factors that may influence the generation of forecast 245 and use them in combination to generate forecast 245. For example, forecast data 215-1 may correspond to a history of previous power usage by the nodes 141-*c*, 142-*d*, and 143-*e*. Forecast data 215-2 may correspond to a weather forecast for the area covered by the electrical distribution network. Forecast data 215-9 may correspond to the current power usage of the nodes 141-*c*, 142-*d*, and 143-*e*. It will be appreciated that any data relevant to the generation of a forecast 245 for power usage in the electrical distribution network may be collected by the forecast generation component 255 and used in the generation of forecast 245. In some embodiments, the forecast generation component 255 may be part of or otherwise distributed with the optimization application 220 and that in other embodiments the forecast generation component 255 may be separate from optimization application 220. For example, in some embodiments, the forecast generation component 255 may be provided by a first software provider and the optimization application 220 by a second software provider, with interoperability between the two configured as part of the installation of the optimization application 220.

The optimization application 220 may comprise an optimization component 270. The optimization component 270 may be generally arranged to receive the model capacitor banks and model voltage regulators and determine one or more device settings 285 for the multiple capacitor banks 130-*b* and multiple voltage regulators 120-*a* that allow for providing power within predetermined limits while reducing power loss as compared to a power loss of the existing settings 280 or reducing power usage as compared to power usage of the existing settings 280, the one or more settings for the multiple voltage regulators 120-*a* determined according to a heuristic in which potential settings are iteratively determined for each of the model voltage regulators based on a least squares model of load flow analysis. Alternatively, the one or more settings for the multiple voltage regulators 120-*a* may be determined according to a heuristic in which potential settings are iteratively determined for each of the model voltage regulators based on a node for each voltage regulator at risk of violating the predetermined limits.

Each node of the plurality of nodes 141-*c*, 142-*d*, and 143-*e* is associated with one voltage regulator of the multiple voltage regulators 120-*a* from which it is immediately downstream. A node is downstream from a voltage regulator if it receives its electrical power through that voltage regulator. The heuristic determines the potential settings for each of the model regulators based on a node for each voltage regulator most at risk of violating the predetermined limits. The node that is most at risk of violating the predetermined limits is the node closest to or furthest beyond the boundary of the predetermined limit appropriate to the form of optimization being performed.

Where the determined one or more device settings 285 are to reduce power usage, the node for each voltage regulator most at risk of violating the predetermined limits is the associated node with the lowest voltage according to the load-flow prediction. The node with the lowest voltage according to the load-flow prediction will be the node closest to (if within the predetermined limit) or furthest beyond the lower bound of the predetermined limit for voltage.

Where the determined one or more device settings 285 are to reduce power usage, the optimization component 270 may be operative to begin iterating at model voltage regulators without further model voltage regulators downstream and proceed iterating towards model voltage regulators closer to the source, wherein each model voltage regulator is assigned a potential setting that produces a voltage within the predetermined limits closest to a lower bound for the predetermined limits given possible settings for the corresponding voltage regulator, wherein voltage changes produced by potential settings are accumulated to upstream voltage regulators prior to assigning potential settings for the upstream voltage regulators.

Where the determined one or more device settings 285 are to reduce power loss, the node for each voltage regulator most at risk of violating the predetermined limits is the associated node with the highest voltage according to the load-flow prediction. The node with the highest voltage according to the load-flow prediction will be the node closest to (if within the predetermined limit) or furthest beyond the upper bound of the predetermined limit for voltage.

Where the determined one or more device settings 285 are to reduce power loss, the optimization component 270 may be operative to begin iterating at model voltage regulators without further model voltage regulators downstream and proceed iterating towards model voltage regulators closer to the source, wherein each model voltage regulator is assigned a potential setting that produces a voltage within the predetermined limits closest to a higher bound for the predetermined limits given possible settings for the corresponding voltage regulator, wherein voltage changes produced by potential settings are accumulated to upstream model voltage regulators prior to assigning potential settings for the upstream model voltage regulators.

In some embodiments, the optimization component 270 may be operative to set all the model capacitor banks to their existing settings in the electrical distribution network; determine a first set of potential settings based on all the model capacitor banks being set to their existing settings; set all the model capacitor banks to an on setting within the model; determine a second set of potential settings based on all the model capacitor banks being set to the on setting; set all the model capacitor banks to an off setting within the model; determine a third set of potential settings based on all the model capacitor banks being set to the off setting; and select one of the first set of potential settings, second set of potential settings, and third set of potential settings. The sets of potential settings may be decided between according to the objective of power loss minimization or power usage minimization.

In some embodiments, the nodes may be divided into sections corresponding to portions of the electrical distribution network between voltage regulators. Where the determined one or more settings are to reduce power usage, the optimization component 270 may move tap settings of the model voltage regulators down to decrease voltage in each of the sections. Where the determined one or more settings are to reduce power loss, the optimization component 270 may adjust tap settings of the voltage regulator for each section according to load characteristics for the section. For power loss reduction case, tap settings for a voltage regulator may be increased when constant power dominates the section, and tap settings for a voltage regulator may be decreased when constant impedance dominates the section.

Figure 3:
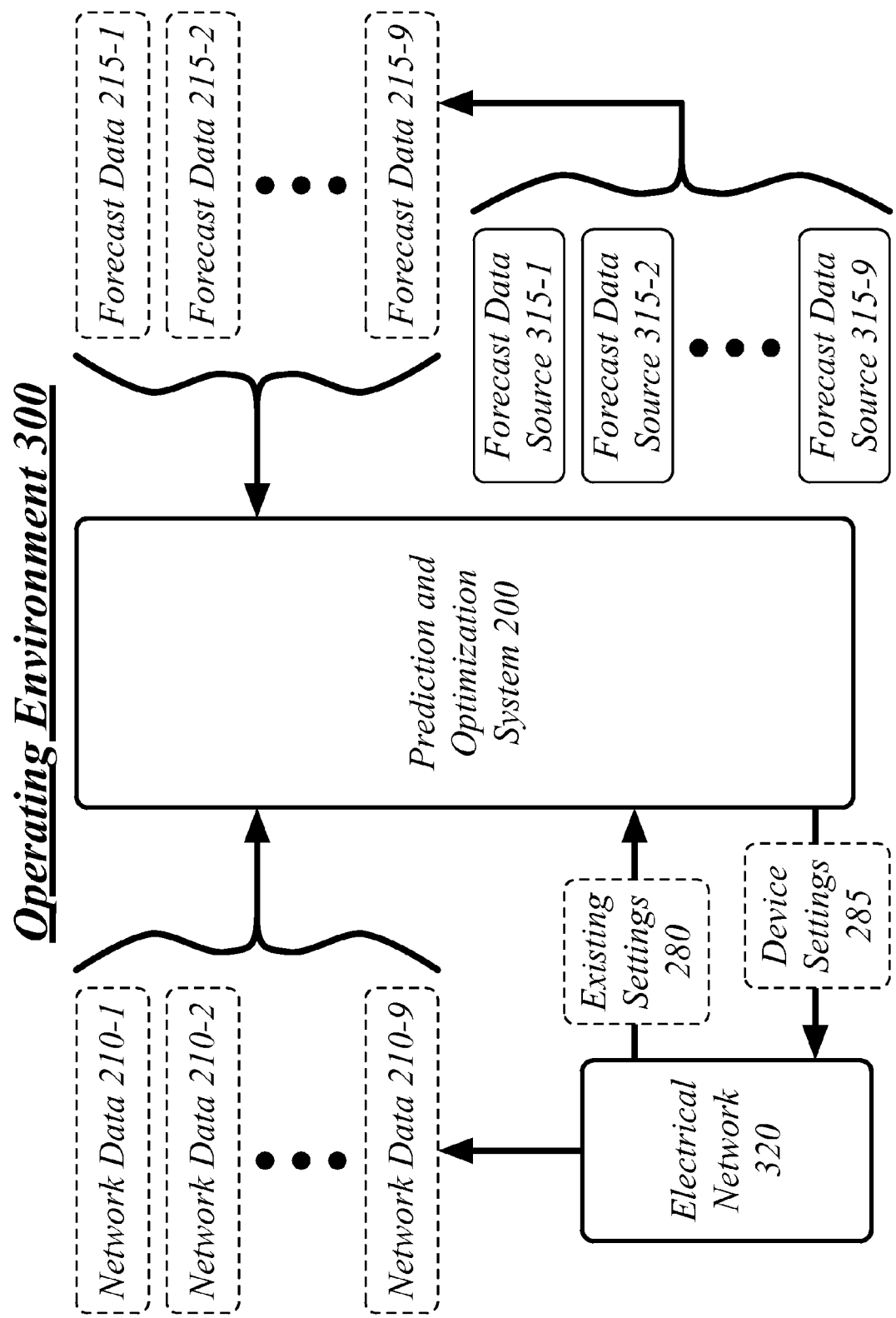
FIG. 3 illustrates a second example operating environment illustrating communication between the prediction and optimization system and the electrical network.

FIG. 3 illustrates an example of an operational environment 300 for the prediction and optimization system 200. FIG. 3 illustrates communication between the prediction and optimization system 200 and the electrical network 320.

The prediction and optimization system 200 may receive the existing settings 280 for the electrical devices—including voltage regulators 120-*a* and capacitor banks 130-*b*—from the electrical network 320. Receiving the existing settings 280 from the electrical network 320 may comprise, for instance, receiving the existing settings from a control unity for the electrical network 320, such as on request by the prediction and optimization system 200.

The network data 210-*f* may be produced by the electrical network 320 and passed to the prediction and optimization system 200 using the data integration component 235 discussed with reference to FIG. 2. In some embodiments, the network data 210-*f* may also include network data retrieved from additional sources, such as a design or layout documents not integrated with the electrical network 320.

The forecast data 215-*g* may be gathered from a plurality of forecast data sources 315-*h*. The forecast data sources 315-*h* may be heterogeneous data sources operated by different entities, none or only some of which may be the same entity operating the prediction and optimization system 200 and the electrical network 320. For example, where forecast data 215-1 corresponds to a history of previous power usage by the nodes 141-*c*, 142-*d*, and 143-*e*, forecast data source 315-1 may be a component of the electrical network 320. Similarly, where forecast data 215-9 corresponds to the current power usage of the nodes 141-*c*, 142-*d*, and 143-*e*, forecast data source 315-9 may also be a component of the electrical network 320. In contrast, where forecast data 215-2 corresponds to a weather forecast for the area covered by the electrical distribution network, forecast data source 315-2 may correspond to a weather forecast service.

Figure 4:
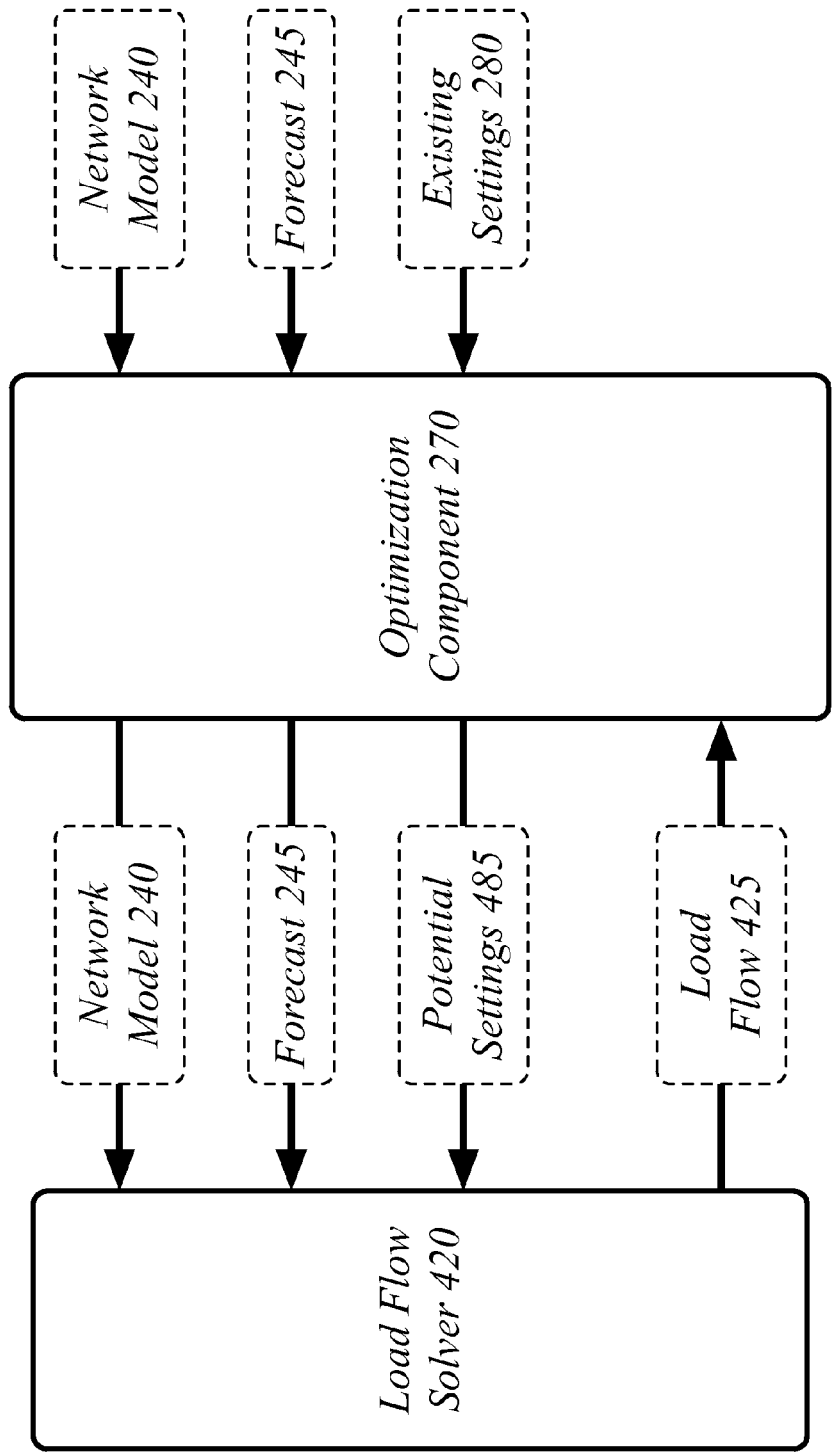
FIG. 4 illustrates a third example operating environment illustrating communication between the optimization component and a load flow solver.

FIG. 4 illustrates an example of an operational environment 400 for the prediction and optimization system 200. FIG. 4 illustrates communication between the prediction and optimization system 200 and a load flow solver 420.

The load flow solver 420 may be generally operative to receive a network model 240, forecast 245 of demand on an electrical distribution network represented by the network model 240, and potential settings 485 representing a plurality of device settings being considered for the electrical distribution network. The potential settings 485 may represent just one of a number of settings being considered by the optimization and prediction system 200. The load flow solver 420 may be general operative to produce a load flow 425 given the network model 240, forecast 245, and potential settings 485. The load flow 425 may embody a prediction by the load flow solver 420 of electrical power flow through the electrical distribution network represented by the network model 240, including predictions of voltages and current flows at each of the devices of the electrical distribution network. The load flow solver 420 may operate according to any of the known techniques for load-flow study, including, non-exclusively, the Gauss-Seidel method, the Newton-Raphson method, the fast-decoupled-load-flow method, and the homomorphic embedding load-flow method. The load flow solver 420 may comprise an integrated element of the optimization application 220, may comprise a module loaded into the optimization application 220, or may comprise a separate application used in combination with the optimization application 220.

Where the one or more device settings 285 are to reduce power usage, the optimization component 270 may be operative to perform a load-flow analysis based on the network model 240 and the forecast 245 to generate a load-flow prediction and determine the node for each voltage regulator most at risk of violating the predetermined limits as an associated node with a lowest voltage according to the load-flow prediction.

Where the one or more device settings 285 are to reduce power loss, the optimization component 270 may be operative to perform a load-flow analysis based on the network model 240 and the forecast 245 to generate a load-flow prediction and determine the node for each model voltage regulator most at risk of violating the predetermined limits as an associated node with a highest voltage according to the load-flow prediction.

Performing the load-flow analysis may comprise the optimization component 270 transmitting the network model 240 and forecast 245 to the load flow solver 420 and receiving the load flow 425 in return as the load-flow prediction. The existing settings 280 may be transmitted with the network model 240 and forecast 245 to initially determine the most-at-risk node for each model voltage regulator.

The optimization component 270 may be operative to perform a load-flow analysis based on the network model 240, the forecast 245, and the potential settings 485 for the model voltage regulators; determine that the load-flow analysis indicates that at least one node on the electrical distribution network would receive power outside the predetermined limits; and adjust the potential settings and test the adjusted potential settings based on each adjustment of the potential settings using load-flow analysis until the load-flow analysis indicates that all nodes on the electrical distribution network would receive power within the predetermined limits. This may comprise a search process iteratively attempting to find the settings for the devices of the electrical distribution network that come as close as possible to the predetermined limits without exceeding them. In some embodiments, the potential settings may be adjusted by at most one increment for each voltage regulator each iteration.

In some cases, the modifications to the settings of the voltage regulators 120-a may cause a condition in which the operating voltage deviates from the acceptable range. In order to avoid this, the prediction and optimization system 200 may be operative to check potential settings using the network model 240 to confirm that load-flow analysis doesn't indicate that the voltage goes out of range. The optimization component 270 may be operative to perform a load-flow analysis based on the network model 240, the forecast 245, and the potential settings 485; determine that the load-flow analysis indicates that the operating voltage will get out of range; and modify the potential settings 485 for the model voltage regulators to prevent the operating voltage from getting out of range.

In some cases, the modifications to the settings of the capacitors 130-b may cause a condition in which reactive power flows backwards towards the source through the transformer 110. In order to avoid this, the prediction and optimization system 200 may be operative to check potential settings using the network model 240 to confirm that load-flow analysis doesn't indicate that reactive power would flow back towards the source. The optimization component 270 may be operative to perform a load-flow analysis based on the network model 240, the forecast 245, and the potential settings 485; determine that the load-flow analysis indicates that reactive power would flow back towards the source; and modify the potential settings 485 for the model capacitors to prevent reactive power from flowing back towards the source.

Figure 5:
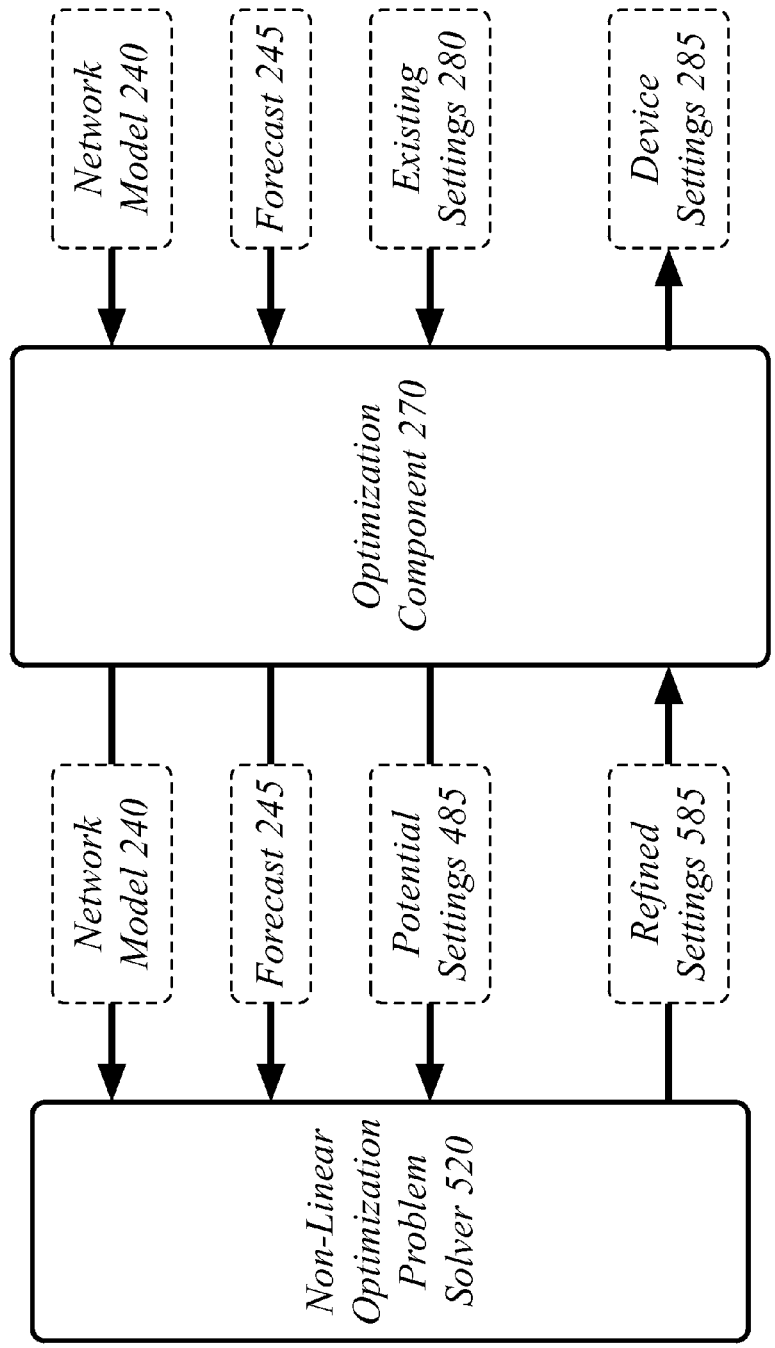
FIG. 5 illustrates a fifth example operating environment illustrating communication between the optimization component and a non-linear optimization problem solver.

FIG. 5 illustrates an example of an operational environment 500 for the prediction and optimization system 200. FIG. 5 illustrates communication between the optimization component 270 and a non-linear optimization problem solver 520.

A non-linear optimization problem may be described as an attempt to find an optimal assignment of values to the variables of a problem defined by non-linear constraints and an objective. The non-linear constraints define feasible assignments of values. The objective defines a single-number evaluation of the assignment of values to the variables. An optimal solution to a non-linear optimization problem would be an assignment of values to the variables of the problem that minimizes (or maximizes, depending on the problem) the objective while meeting the constraints. The optimal solution may be unique or may be one of a number of possible optimal solutions. An optimized solution (as distinguished from an optimal solution) to a non-linear optimization problem may be the result of an attempt to generate as good a solution as achievable given further real-world restrictions such as the available computational resources and computational time. For example, a non-linear optimization program may be given the processing resources of one or more computers (e.g., a single workstation or a computing cluster) for a specified period of time. The nonlinear optimization program would then attempt to optimize the objective given those resources and within the specified amount of time.

The optimization component 270 may be operative to use a mixed-integer non-linear optimization problem solver 520 to refine the determined potential settings 485. The optimization component 270 may formulate a mixed-integer non-linear optimization problem using the network model 240, forecast 245, and potential settings 485 and receive in response refined settings 585 improving on the potential settings 485. These refined settings 585 may then be used as the device settings 285. The non-linear optimization problem solver 520 may operate according to any of the known techniques for non-linear optimization problem solving.

Figure 6A:
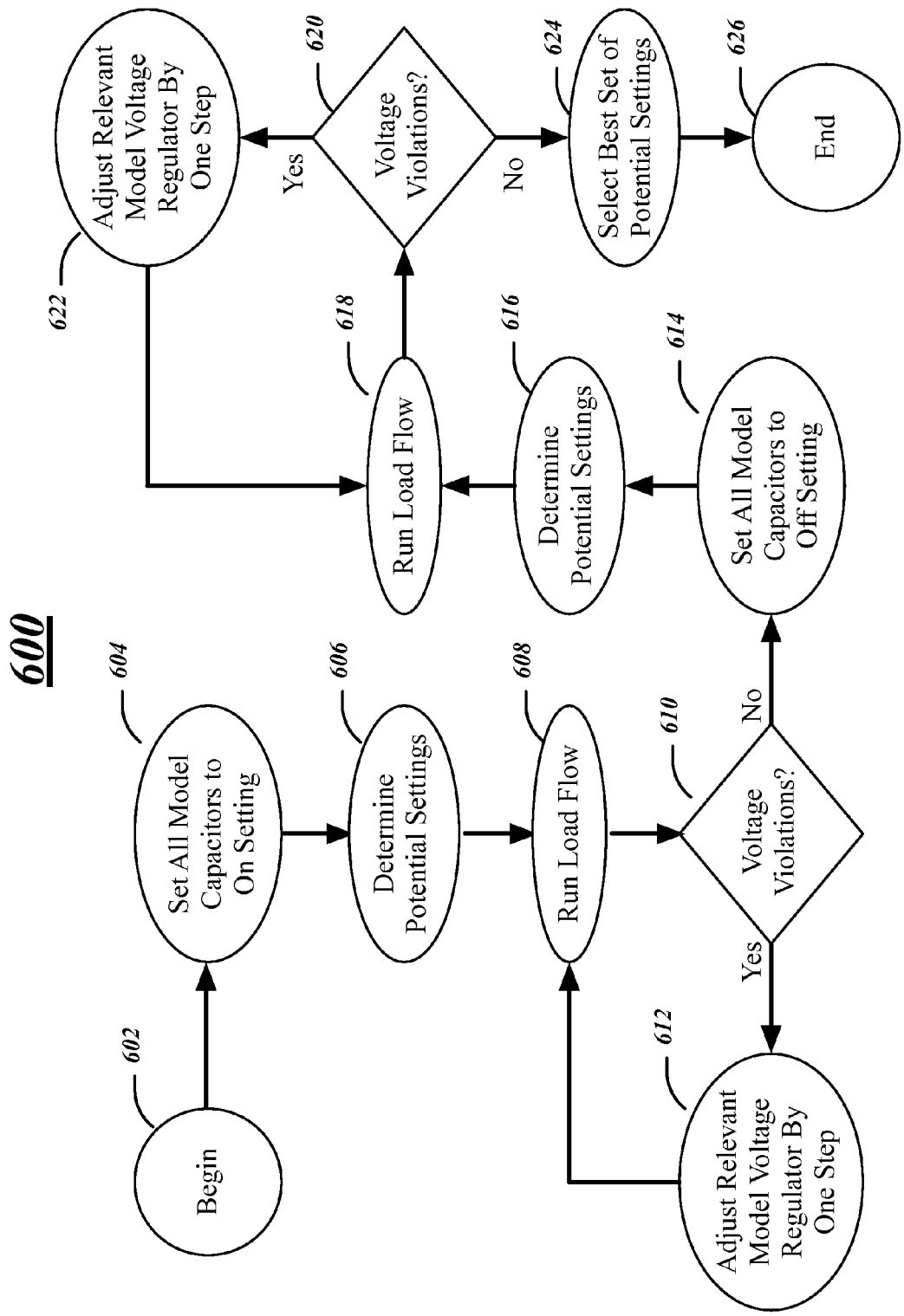
FIG. 6A illustrates an example of a logic flow for the prediction and optimization system of FIG. 2.

FIG. 6A illustrates an example of a logic flow 600 for the prediction and optimization system 200 of FIG. 2. The logic flow 600 may be representative of some or all of the operations executed by one or more embodiments described herein. FIG. 6A may correspond to a network with only one voltage regulator, representing a special case of a more general technique.

The logic flow 600 may begin at block 602.

The logic flow 600 may set all the model capacitors to an on setting in the network model 240. Capacitors on a distribution network are either in an "on" state or the "off" state. In contrast, voltage regulators include autotransformers that can adjust phase voltage in a total of 33 steps (referred to as tap setting or regulator taps), where there are 16 steps or tap settings in the positive direction, 16 steps in the negative direction, and a neutral position.

The logic flow 600 may determine an initial set of potential settings for the voltage regulators at block 606. These initial potential settings may correspond to the existing settings 280 of the electrical distribution network.

The logic flow 600 may run a load flow at block 608.

The logic flow 600 may determine if there are any voltage violations at block 610. If there are, the logic flow 600 may proceed to block 612. Otherwise, the logic flow 600 may proceed to block 614. Blocks 608, 610, and 612 comprise a cycle that continues until a solution is reached where the nodal voltages are within predetermined limits.

The logic flow 600 may adjust a relevant model voltage regulator by one step at block 612 and then return to block 608. From the results of the load flow, the nodes having the lowest voltage (where the goal is to reduce power usage) or the highest voltage (where the goal is reduce power loss) are identified and associated with a specific voltage regulator. The algorithm then calculates the regulator tap setting needed to bring the voltage for this node to within limits. Where the goal is to reduce power usage, this involves lowering the nodal voltage previously identified to its lowest allowed value, which in many cases will be 0.95 volts measures in per unit (for a system that has a lower limit of −5% from the nominal). Where the goal is to reduce power loss, this involves increasing the nodal voltage previously identified to its highest allowed value, which in many cases will be 1.05 volts measures in per unit (for a system that has an upper limit of +5% from the nominal).

The logic flow 600 may set all model capacitors to an off setting at block 614. With an optimization routine performed for where the capacitors are set to off, the logic flow 600 will now attempt to optimize the case in which the capacitors are set to on. The best of the two sets of settings produced in each of these cases will be used as the new proposed device settings 285.

The logic flow 600 may, again, determine potential settings for the voltage regulators at block 616, which may correspond to the settings determined from the process of blocks 608, 610, and 612 or may correspond to the existing settings 280.

The logic flow 600 may run another load flow at block 618 based on these new set of potential settings.

The logic flow 600 may determine if there are any voltage violations at block 620. If there are, the logic flow 600 may proceed to block 622. Otherwise, the logic flow 600 may proceed to block 624. Blocks 618, 620, and 622 comprise a second cycle that continues until a solution is reached where the nodal voltages are within predetermined limits based on the capacitors being set to off.

The logic flow 600 may adjust a relevant model voltage regulator by one step at block 622, as before. The logic flow may then return to block 618.

The logic flow 600 may select the best set of potential settings at block 614. The logic flow 600 may select these based on the load flow analysis of the two sets of potential settings that result from all the model capacitors being turned on and all the model capacitors being turned off, once any voltage violations are eliminated.

The logic flow 600 may end at block 626.

Figure 6B:
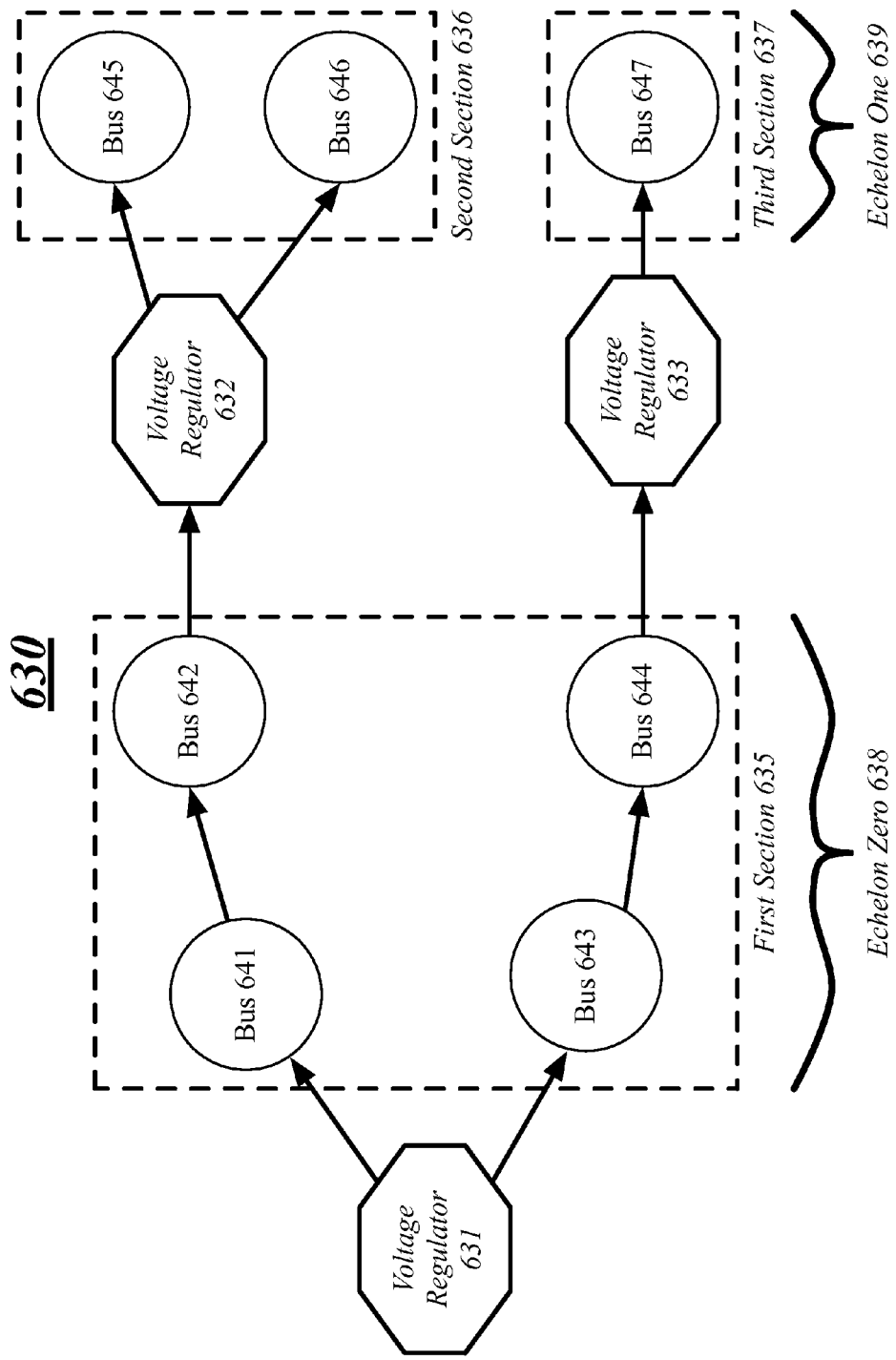
FIG. 6B illustrates an example of a second operating environment for the prediction and optimization system of FIG. 2.

FIG. 6B illustrates an example of a second operating environment 630 for the prediction and optimization system of FIG. 2.

As shown in FIG. 6B, voltage regulator 631 is the voltage regulator closest to the root of the network, such as the voltage regulator closest to the transformer for the electrical distribution network. Voltage regulator 631 may therefore correspond to voltage regulator 120-1 immediately downstream of transformer 110 in operating environment 100 with reference to FIG. 1.

Buses 641, 642, 643, and 644 are downstream from voltage regulator 631 without an intervening voltage regulator between them, and as such buses 641, 642, 643, and 644 are controlled by voltage regulator 631. Buses 641, 642, 643, and 644 are therefore in a first section 635 comprising those buses controlled by the first voltage regulator 631.

Buses 645 and 646 are downstream from both voltage regulator 631 and voltage regulator 632. However, buses 645 and 646 are only immediately downstream from voltage regulator 632 because only voltage regulator 632 is upstream from buses 645 and 646 without an intervening voltage regulator between them. As such, buses 645 and 646 are controlled by voltage regulator 632. Buses 645 and 646 are therefore in a second section 636 comprising those buses controlled by the second voltage regulator 632.

Bus 647 is downstream from both voltage regulator 631 and voltage regulator 633. However, bus 647 is only immediately downstream from voltage regulator 633 because only voltage regulator 633 is upstream from bus 647 without an intervening voltage regulator between them. As such, bus 647 is controlled by voltage regulator 633. Bus 647 is therefore in a third section 637 comprising the one bus controlled by the third voltage regulator 633.

In general, each bus is in a section comprising precisely those buses immediately downstream from a particular voltage regulator, wherein a bus is immediately downstream from that particular voltage regulator if no other voltage regulator intervenes (is in the electrical path between) those buses and that particular voltage regulator. Each bus is also in a particular echelon. Each bus is in an echelon comprising precisely those buses in every section with a same number of voltage regulators between that section and the root of the electrical power distribution network. The buses 641, 642, 643, and 644, comprising the first section 635, are in echelon zero 638 as they are all immediately downstream from the voltage regulator 631 forming the root of the electrical power distribution network, with therefore zero voltage regulators between them and the root of the electrical power distribution network. The buses 645, 646, and 647, comprising the second section 636 and third section 637, are in echelon one 639 as they are all in a section where there is one voltage regulator (either voltage regulator 632 or voltage regulator 633) between them and the root of the electrical power distribution network, voltage regulator 631. Expressed in an alternative manner, the section immediately downstream from the root voltage regulator are echelon zero, with the echelon number growing by one with each voltage regulator down the tree of the electrical power distribution network.

Figure 6C:
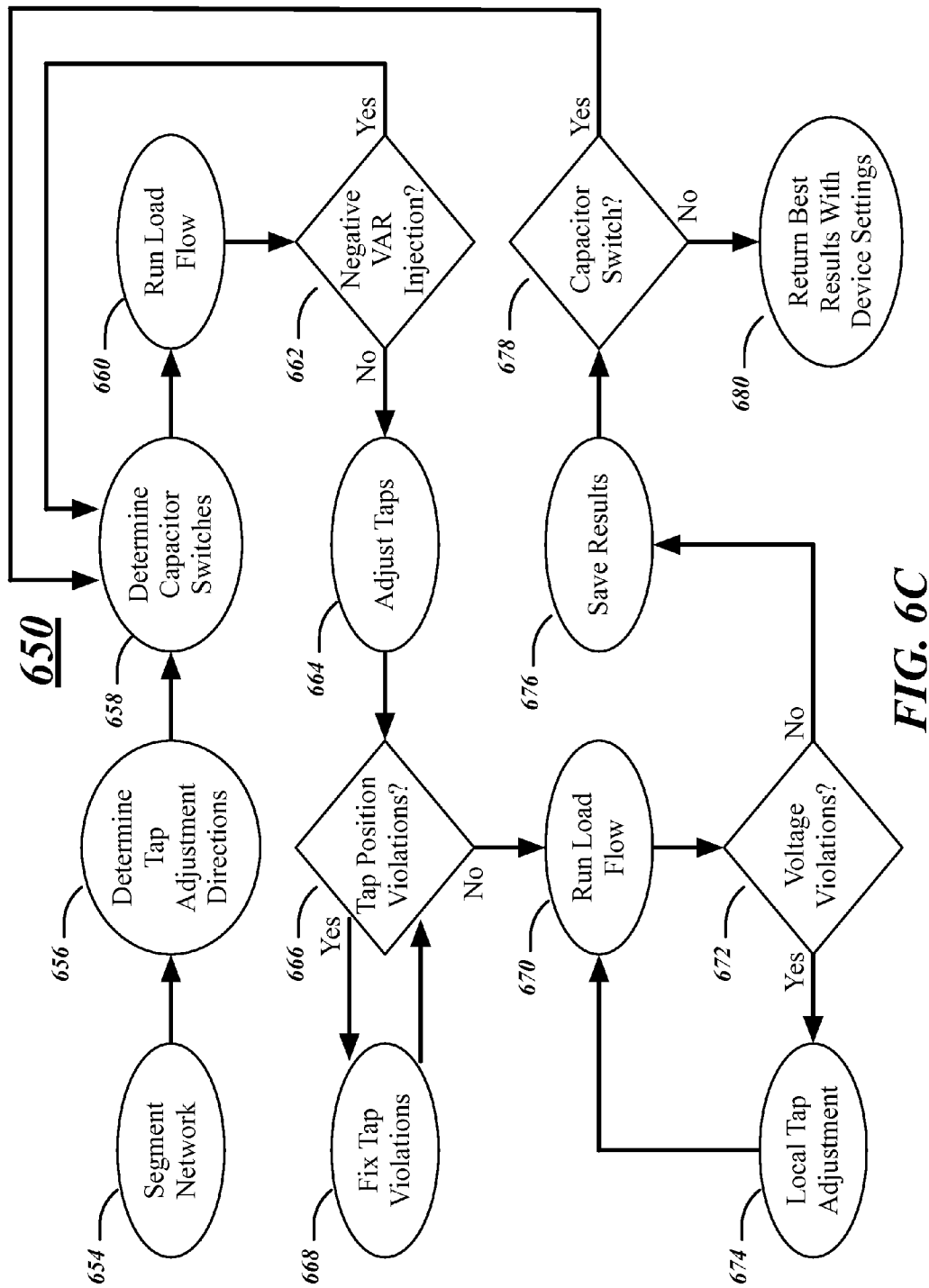
FIG. 6C illustrates an example of a second logic flow for the prediction and optimization system of FIG. 2.

FIG. 6C illustrates an example of a second logic flow 650 for the prediction and optimization system of FIG. 2.

The logic flow 650 may begin at box 654 by segmenting the electrical power distribution network according to the voltage regulators and transformers. As discussed with reference to FIG. 6B, the electrical power distribution network can be divided into section and echelons with the voltage regulators forming the dividing lines between the sections and echelons.

The process of segmenting the electrical power distribution network may be performed iteratively. Starting at the root of the network tree, each path is followed outwards along the direction that electrical power flows. Along a given path, each bus on that path is added to the same section so long as they are not separated by a voltage regulator or transformer. Once a voltage regulator is reached, a new section is started. The echelon number of the section or sections immediately downstream from the first voltage regulator is zero, with the echelon number of a section incrementing by one (as compared to the previous upstream section) with each voltage regulator. Sections with the same echelon number are in the same echelon. Tracking the echelon number of a section allows for the calculation of ripple effects of settings being applied to upstream regulators.

The logic flow 650 may determine tap adjustment directions at box 656. In each defined section, depending on the load character and objectives, a decision is made between increasing the voltage of the section by moving up the taps and decreasing the voltage of the section by moving down the taps.

Tap adjustment is dependent on the objective of the optimization: loss minimization (LM) or conservation voltage reduction (CVR). For conservation voltage reduction, the objective is to lower the voltage of the system as much as possible subject to the lowest voltage requirements, as may be determined according to regulations or contractual agreements. As such, in each section the taps are moved down to attempt to decrease the voltage.

For loss minimization, the adjustments depend on the load character in each section. For load characteristics, three scenarios are considered. If constant power dominates the section, then the voltage is increased subject to the upper bound of the limits on acceptable voltages. This minimizes the current and therefore the copper loss resulting from the Joule heating of the conductor, as measured by the square of the current multiplied by the resistance within the network. If constant impedance dominates the section, then the voltage is decreased as much as possible instead. This minimizes the losses through impedance, as measured by the square of the voltage divided by the resistance within the network. If there is only constant current in the section, then the voltage is kept as it is. In this case, the losses are independent of the voltage.

The logic flow 650 may determine capacitor switches at block 658. The logic flow 650 may iterate through blocks 660 through 676 with the different potential capacitor settings, retain the other settings (e.g., voltage regulator tap settings) and their LM or CVR savings, then select the joint settings (both capacitor and voltage regulator settings) which best achieve the objective. The three potential capacitor settings considered may be to set all of the capacitors to the on phase, to set all of the capacitors to the off phase, and to retain the current settings of the capacitors.

The logic flow 650 may run a low flow analysis at block 660. The load flow analysis may determine three-phase power flow through the electrical power distribution network given the known properties of the network as expressed in the network model 240, the forecast 245, and the potential settings under consideration for the capacitor banks 130-b and voltage regulators 120-a.

In some embodiments, a constrained mathematical programming model may be used for load flow analysis. However, embodiments using a Least Squares Model (LSM), in which power balance equations are converted to a least square objective function, may have reduced solution time due to quicker convergences. The least square model is an unconstrained optimization problem. The least squares model converts the power balance equations to a minimization of the sum of tolerance of the power balance equation, allowing multiple techniques to solve the least square model. In additional, another advantage to the unconstrained problem technique is that it will more quickly or is more likely to converge as compared many techniques for solving constrained problems, as these are often based on solving multiple unconstrained sub-problems. Existing non-linear optimization solvers, which may correspond to non-linear optimization problem solver 520, may used to solve the least squares problem.

The objective function in the least squares model is as follows:

Minimize $\Sigma_{i=1}^n \Sigma_{p=1}^3 LSP(i,p)$

Subject to $v_{i\,min}^p \leq v_i^p \leq v_{i\,max}^p$ $\theta_{i\,min}^p \leq \theta_i^p \leq \theta_{i\,max}^p$ for each bus and phase.

where $LSP(i,p) = (P_i^p - v_i^p \Sigma_{k=1}^n \Sigma_{m=1}^3 v_k^m [G_{ik}^{pm} \cos \theta_{ik}^{pm} + B_{ik}^{pm} \sin \theta_{ik}^{pm}])^2 + (Q_i^p - v_i^p \Sigma_{k=1}^n \Sigma_{m=1}^3 v_k^m [G_{ik}^{pm} \sin \theta_{ik}^{pm} - B_{ik}^{pm} \cos \theta_{ik}^{pm}])^2,$ and $\theta_{ik}^{pm} = \theta_i^p - \theta_k^m$, The terms i and k are used to iterate through or sum over each bus in the network. The terms p and m are used to iterate through or sum over the bus phases for each bus. Term $v_i^p$ denotes voltage at phase p of bus i. Term $\theta_i^p$ denotes voltage angle at phase p of bus i. Term $P_i^p$ denotes the real part of load forecast 245. Term $Q_i^p$ denotes the imaginary part of load forecast 245. Term $B_{ik}^{pm}$ represents the impedance of imaginary part between bus i and k between phases. Term $G_{ik}^{pm}$ represents the impedance of real part between bus i and k for each phase.

The logic flow 650 may determine whether negative reactive power (VAR) injection is projected to occur at block 662. If the total injection of reactive power into the system is negative according to the load flow analysis, that means some capacitors have provided reactive power back to the system, and reactive current flow has increased in the opposite direction. If this happens, some capacitors will be switched off to correct this in order to avoid over-voltages and increased copper loss. Flow returns to block 658 where capacitor switches are determined. The capacitors that are already on are sorted by size and phase. Capacitors are turned off starting from the smallest size (selected from among only those that were previously on) until negative reactive power in each phase is gone.

If negative reactive power injection is not projected, then the logic flow 650 continues to block 664.

The logic flow 650 may adjust the tap settings at block 664. The tap changes are made for each section and each phase. The formula for these changes is $t_{kp}^m = (v_{kp}^m - v_{k0}^m)/0.00625$.

The term $t_{kp}^m$ is the raw tap change for echelon m, section k, and phase p. Term $v_{kp}^m$ is the candidate voltage in echelon m, section k, and phase p. Term $v_{k0}^m$ is the target voltage for section k and echelon m. In the case where $t_{kp}^m$ is not an integer, it is rounded to the nearest integer. The formula depends on the assumption that for one tap increase or decrease, the voltage in the affected section will increase or decrease, respectively, by 0.625% on average.

For CVR, the term $v_{kp}^m$ represents the lowest voltage in the section k. The term $v_{k0}^m$, for the $0^{th}$ phase, is the lowest allowable voltage, normally 0.95 in per-unit value.

For LM, where constant power dominates a section, the term $v_{kp}^m$ represents the highest voltage in the section k, and $v_{k0}^m$ is 1.05 which is the highest allowable voltage by per-unit value. Where constant impedance dominates the section, the term $v_{kp}{}^m$ represents the lowest voltage in the section k and $v_{ko}{}^m$ is 0.95 which is the allowable lowest voltage by per-unit value. Where there is only constant current in the section the term $t_{kp}{}^m=0$, corresponding to a decision to not change taps.

After $t_{kp}{}^m$ is calculated for each section k, the final tap changes are calculated by considering the ripple effect of the change based on the echelon of the network. For top echelon section zero, the final tap change is equal to the raw tap changes, no adjustment needed, $r_{kp}{}^0=t_{kp}{}^0$. However, for the other echelons (e.g., m, the term denoting the echelon, is greater than zero), final tap changes at echelon m need to be adjusted based on final tap changes at the previous echelon (m−1). This corresponds to the equation $r_{kp}{}^m=t_{kp}{}^m-r_{kp}{}^{m-1}$. Therefore, given the initial tap position $c_{kp}{}^m$, the final tap position as a result of final tap changes is $d_{kp}{}^m=c_{kp}{}^m+r_{kp}{}^m$.

The logic flow 650 may determine whether tap position violations exist at box 666.

If the tap position for a particular voltage regulator (e.g., $d_{kp}{}^m$ for section k, echelon m, and phase p) is above +16 or below −16, which are beyond the designed boundary of regulators/transformers, adjustment will be performed to correct the violation by proceeding to box 668. Otherwise, the logic flow 350 continues to box 670.

The logic flow 650 may fix tap violations at box 668. Fixing tap violation is a three step process as follows.

In step one, start from the most downstream echelon j. For each section s with violations, then if $d_{sp}{}^j$ is less than −16 then let $d_{sp}{}^j$ be set to −16. Otherwise, if $d_{sp}{}^j$ is greater than +16, then let $d_{sp}{}^j$ be set to +16.

In step two, final tap changes for section s are determined. For section s at echelon j, set $r_{sp}{}^j$ to be $d_{sp}{}^j-c_{sp}{}^j$ as determined in reference to box 664.

In step three, for echelon w as selected from the set {j−1, j−2, ... 0}, for each section z, the adjusted final tap, $r_{zp}{}^w$, is set to $r_{zp}{}^{w+1}+t_{zp}{}^w$.

At the completion of this three-step process, the logic flow returns to box 666 to determine whether tap violations continue to persist, in which case the logic flow 650 again proceeds to box 668.

The logic flow 650 may again run a load flow analysis at box 670. This load flow analysis may be performed according to the same techniques described in reference to box 660.

The logic flow 650 may determine whether voltage violations are projected to occur at box 672. If voltage violation exist from the load flow analysis of box 670, the settings generated at box 666 and 668 are not acceptable and additional adjustment to the tap settings of the voltage regulators are needed. As such, the logic flow 650 continues to box 674. Otherwise, the logic flow 650 continues to box 676.

The logic flow 650 may make local tap adjustments at box 674 to correct voltage violations.

Due to the nature of the electronic system, voltage violation will only occur either at above high voltage side (1.05) or below low voltage side (0.95), not both at the same time. As such, if the highest bus voltage (denoted by V1p) of phase p in the system is above 1.05, and that bus belongs to echelon m, section k, the additional adjustment for section k and phase p is $t_{kp}{}^m=(V1p-1.05)/0.00625$. If the lowest voltage (denoted by V2p) in the system is below 0.95, and that bus belongs to echelon m, section k, the additional adjustment for section k and phase p is $t_{kp}{}^m=(0.95-V2p)/0.00625$.

After this adjustment, the logic flow 650 returns to box 670 to run a new load flow analysis and then box 672 to determine whether voltage violations continue to persist. If they are resolved, the logic flow may proceed to box 676.

The logic flow 650 may save the results of the preceding operations at box 676. These results include the determined potential device settings for the capacitor banks 130-b and voltage regulators 120-a and the results of the load flow analysis.

The logic flow 650 may determine whether additional capacitor switch settings should be analyzed at block 678. As discussed with reference to box 658, multiple capacitor switch settings may be analyzed and the best result (as determined according to the objective of LM or CVR) selected. If additional capacitor switch settings are still to be analyzed, the logic flow 650 may return to box 658 and iterate to the next capacitor switch setting. If all of the capacitor switch settings under consideration have been analyzed, then the logic flow 650 may proceed to box 680.

The logic flow 650 may return the results and device settings with the best results at box 680.

FIG. 7 illustrates a block diagram of a centralized system 700. The centralized system 700 may implement some or all of the structure and/or operations for the prediction and optimization system 200 in a single computing entity, such as entirely within a single device 720.

The device 720 may comprise any electronic device capable of receiving, processing, and sending information for the prediction and optimization system 200. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the prediction and optimization system 200 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the prediction and optimization system 200 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with other devices 710-*i* and 750-*j* over a communications media 712, 742, respectively, using communications transmissions 714, 744, respectively, via the communications component 740. The devices 710-*i* and 750-*j* may be internal or external to the device 720 as desired for a given implementation.

Devices 710-*i* may correspond to some or all of the forecast data sources 315-h. For example, device 710-2 may be a server maintained by a weather forecast service for the distribution of weather forecasts, and therefore be responsible for providing forecast data 215-2 to the forecast generation component 255. Device 710-1 may be a server maintained by the electrical power distributor maintaining a history of previous power usage by the nodes 141-*c*, 142-*d*, and 143-*e*, operating as forecast data source 315-1. Device 710-9 may be another, or the same, server maintained by the electrical power distributor maintaining or having access to the current power usage of the nodes 141-*c*, 142-*d*, and 143-*e*, operating as forecast data source 315-9. Transmissions 714 sent over media 712 may, therefore, comprise requests from the forecast generation component 255 to the forecast data sources 315-*h* and responses carrying the forecast data 215-*g*.

Electrical network devices 750-*j* may correspond to some or all of the sources for the network data 210-*f* describing the layout of the electrical distribution network. Electrical network devices 750-*j* may include the source of existing settings 280. As such, transmissions 744 sent over media 742 may comprise requests from the data integration component 235 to the electrical network devices 750-*j* for network data 210-*f* and the transmission of network data 210-*f* back in response. Similarly, transmissions 744 sent over media 742 may comprise a request or requests for existing settings 280 to one or more of the electrical network devices 750-*j* and transmission of the existing settings 280 in response.

In some embodiments, the optimization application 220 may be operative to programmatically configure the electrical distribution devices of the electrical distribution network. In these embodiments, one or more of the electrical network devices 750-*j* may comprise electrical distribution devices with the transmissions 744 sent over media 742 comprising commands to configure the electrical distribution devices according to the determined device settings 285. The optimization application 220 may be operative to programmatically configure the electrical distribution devices after displaying the device settings 285 to an operator of the electrical distribution network and receiving approval to configure the electrical distribution devices. In some cases, the operator of the electrical distribution network may modify the device settings 285 and then instruct the optimization application to configure the electrical distribution devices based on the modified settings.

Figure 8:
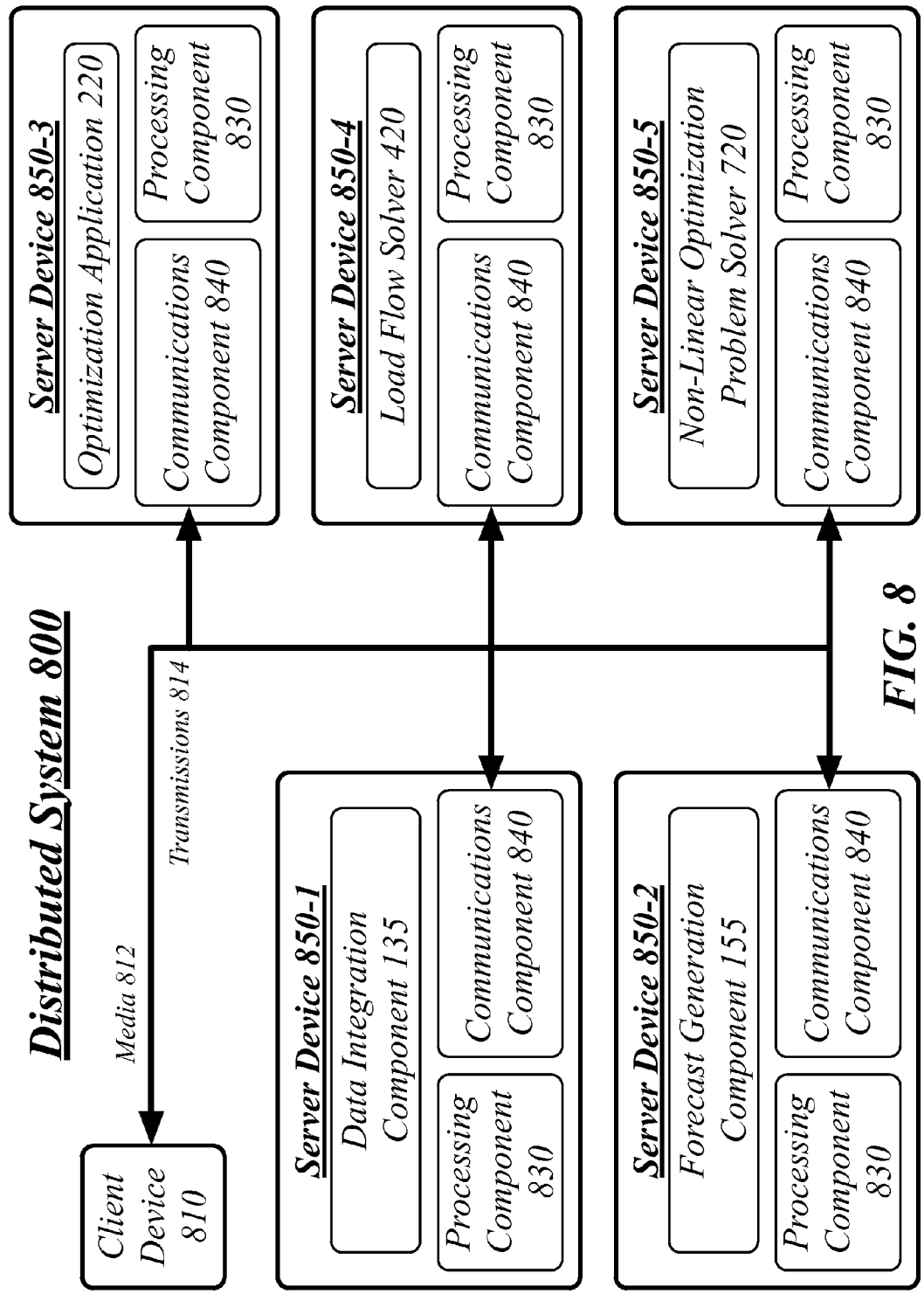
FIG. 8 illustrates an example of a distributed system for the prediction and optimization system of FIG. 2.

FIG. 8 illustrates a block diagram of a distributed system 800. The distributed system 800 may distribute portions of the structure and/or operations for the prediction and optimization system 200 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 810 and server devices 850-*k*. In general, the client device 810 and server devices 850-*k* may be the same or similar to the client device 720 as described with reference to FIG. 7. For instance, the client device 810 and server devices 850-*k* may each comprise a processing component 830 and a communications component 840 which are the same or similar to the processing component 730 and the communications component 740, respectively, as described with reference to FIG. 7. In another example, the devices 810, 850-*k* may communicate over a communications media 812 using communications transmissions 814 via the communications components 840.

The client device 810 may comprise or employ one or more client programs that operate to perform various methodologies in accordance with the described embodiments. In one embodiment, for example, the client device 810 may implement a user terminal for interaction with a plurality of server devices 850-*k* implementing various component of prediction and optimization system 200.

The server devices 850-*k* may comprise or employ one or more server programs that operate to perform various methodologies in accordance with the described embodiments. For example, server device 850-1 may implement data integration component 135. Server device 850-2 may implement forecast generation component 155. Server device 850-3 may implement optimization application 220 and its constituent components. Server device 850-4 may implement load flow solver 420. Server device 850-5 may implement the non-linear optimization problem solver 720. Transmissions 814 sent over media 812 may, therefore, correspond to the interactions between the optimization application 220 and the data integration component 135, forecast generation component 155, load flow solver 420, and non-linear optimization problem solver 720.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 illustrates one example of a logic flow 900. The logic flow 900 may be representative of some or all of the operations executed by one or more embodiments described herein.

In the illustrated embodiment shown in FIG. 9, the logic flow 900 may receive a network model 240 of an electrical distribution network having multiple capacitor banks 130-b and multiple voltage regulators 120-a, each of the multiple capacitor banks 130-b represented in the model by a model capacitor bank, each of the multiple voltage regulators 120-a represented in the model by a model voltage regulator, the electrical distribution network having a radial layout in which power flows from a source to multiple nodes 141-c, 142-d, and 143-e in which each node is associated with one voltage regulator at block 902. For example, each node may be associated with one voltage regulator from which it is immediately downstream.

The logic flow 900 may receive one or more existing settings 280 for the multiple capacitor banks 130-b and multiple voltage regulators 120-a of the electrical distribution network at block 904. For example, the logic flow 900 may contact the electrical distribution network, such as one of the electrical network devices 705-j, to request the existing settings 280 and receive the existing settings 280 in response.

The logic flow 900 may receive a forecast 245 for demand on the electrical distribution network at block 906. For example, the logic flow 900 may contact a forecast generation component 255 which interacts with forecast data sources 315-h to gather forecast data 215-g and combine the forecast data 215-g to produce the forecast 245.

The logic flow 900 may determine one or more device settings 285 for the multiple capacitor banks 130-b and multiple voltage regulators 120-a that allow for providing power within predetermined limits, such as regulatory limits, while reducing power loss as compared to a power loss of the existing settings 280 or reducing power usage as compared to a power usage of the existing settings 280, the one or more device settings 285 for the multiple voltage regulators 120-a determined according to a heuristic in which potential settings are iteratively determined for each of the model voltage regulators based on a least squares model of load flow analysis at block 908.

The embodiments are not limited to this example.

Figure 10:
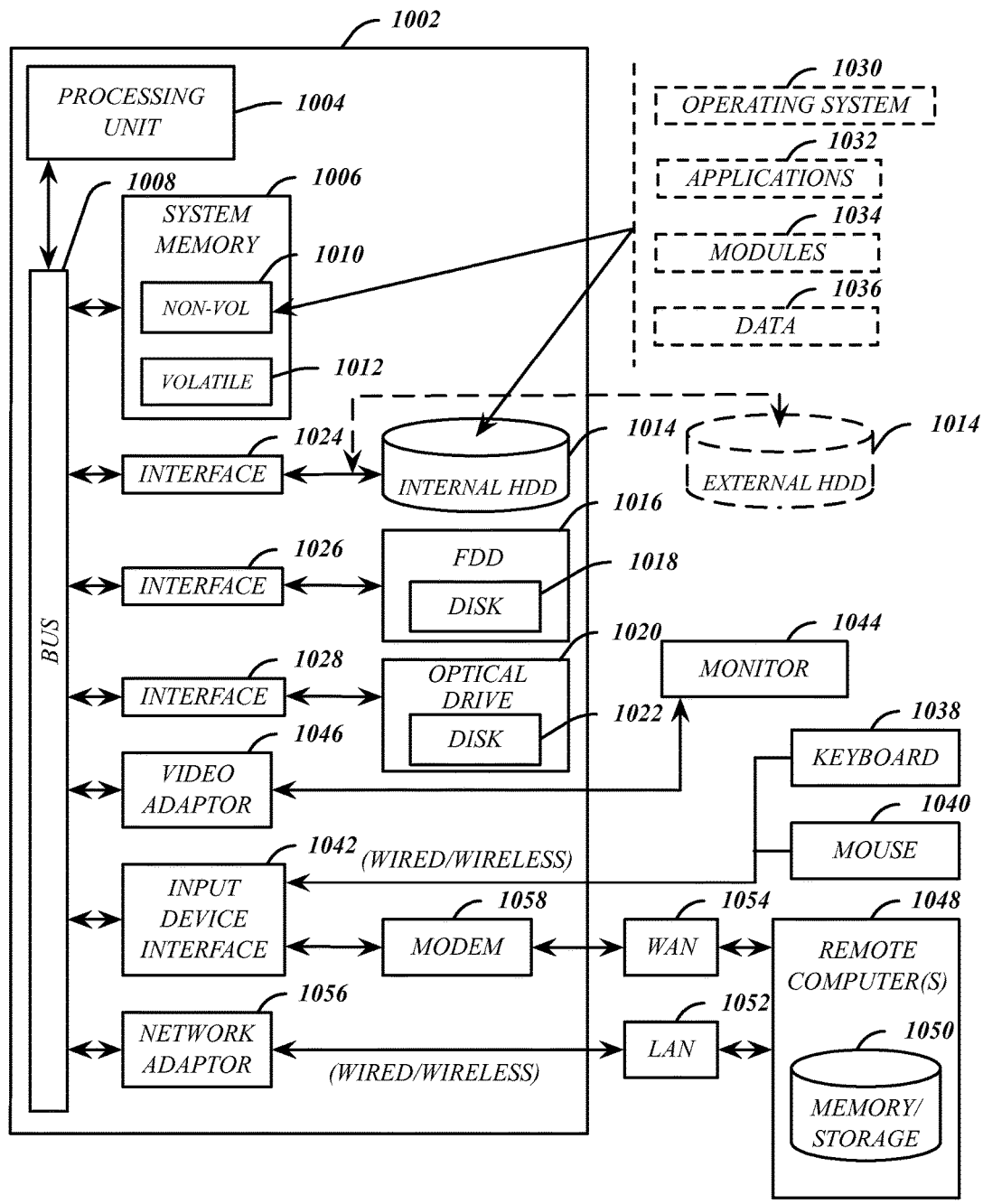
FIG. 10 illustrates an example of a computing architecture.

FIG. 10 illustrates an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the prediction and optimization system 200.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
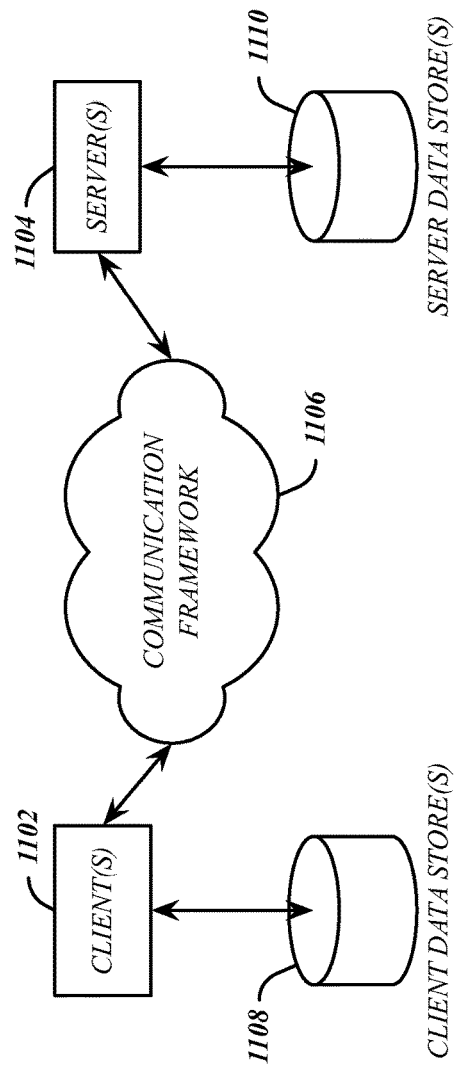
FIG. 11 illustrates an example of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The communication framework 1106 may be operative to provide communication between members of a distributed computing system, grid computing system, or other multi-computer computing system. For example, the communication framework 906 may connect together geographically co-located computation devices cooperatively processing to solve one or more computational tasks. Alternatively or additionally, the communication framework 906 may connect together geographically-separated computational devices performing mostly-independent processing components of a computational task, such as in grid computing. One or both of the client data store 1108 and server data store 1110 may form all or some of a distributed file system, such as may be provided by Apache® Hadoop®.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. At least one non-transitory computer-readable storage medium comprising instructions that, when executed, cause a system to:
   receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;
   receive one or more existing settings for the multiple capacitor banks and multiple voltage regulators of the electrical distribution network;
   receive a forecast for demand on the electrical distribution network;
   determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;
   perform a load-flow analysis based on the model, the forecast, and the potential settings for the model voltage regulators;
   determine that the load-flow analysis indicates that at least one node on the electrical distribution network would receive power outside the predetermined limits; and
   adjust the potential settings and test the adjusted potential settings using the load-flow analysis until the load-flow analysis based on each adjustment of the potential settings indicates that all nodes on the electrical distribution network would receive power within the predetermined limits.

2. At least one non-transitory computer-readable storage medium comprising instructions that, when executed, cause a system to:
   receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;
   receive one or more existing settings for the multiple capacitor banks and multiple voltage regulators of the electrical distribution network;
   receive a forecast for demand on the electrical distribution network;
   determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;
   set all the model capacitor banks to their existing settings in the electrical distribution network;
   determine a first set of potential settings based on all the model capacitor banks being set to their existing settings;
   set all the model capacitor banks to an on setting within the model;
   determine a second set of potential settings based on all the model capacitor banks being set to the on setting;
   set all the model capacitor banks to an off setting within the model;
   determine a third set of potential settings based on all the model capacitor banks being set to the off setting; and
   select one of the first set of potential settings, second set of potential settings, and third set of potential settings.

3. At least one non-transitory computer-readable storage medium comprising further instructions that, when executed, cause a system to:
   receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receive one or more existing settings for the multiple capacitor banks and multiple voltage regulators of the electrical distribution network;

receive a forecast for demand on the electrical distribution network;

determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

perform a load-flow analysis based on the model, the forecast, and the potential settings for the model voltage regulators;

determine that the load-flow analysis indicates that reactive power would flow back towards the source; and modify the potential settings for the model voltage regulators to prevent reactive power from flowing back towards the source.

4. The non-transitory computer-readable storage medium of any one of claims 1, 2, and 3, wherein the nodes are divided into sections corresponding to portions of the electrical distribution network between voltage regulators.

5. The non-transitory computer-readable storage medium of claim 4, wherein the determined one or more settings are to reduce power usage, comprising further instructions that, when executed, cause a system to: move tap settings of the model voltage regulators down to decrease voltage in each of the sections.

6. The non-transitory computer-readable storage medium of claim 4, wherein the determined one or more settings are to reduce power loss, comprising further instructions that, when executed, cause a system to: adjust tap settings of the voltage regulator for each section according to load characteristics for the section.

7. The non-transitory computer-readable storage medium of claim 6, wherein tap settings for a voltage regulator are increased when constant power dominates the section.

8. The non-transitory computer-readable storage medium of claim 6, wherein tap settings for a voltage regulator are decreased when constant impedance dominates the section.

9. The non-transitory computer-readable storage medium of any one of claims 1, 2, and 3, comprising further instructions that, when executed, cause a system to: use a mixed-integer non-linear optimization problem solver to refine the determined potential settings.

10. An apparatus comprising:
processing circuitry; and
logic, at least partially implemented by the processing circuitry, the logic to:
receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receive a forecast for demand on the electrical distribution network; receive the model capacitor banks and model voltage regulators and determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

perform a load-flow analysis based on the model, the forecast, and the potential settings for the model voltage regulators;

determine that the load-flow analysis indicates that at least one node on the electrical distribution network would receive power outside the predetermined limits; and adjust the potential settings and test the adjusted potential settings based on each adjustment of the potential settings using the load-flow analysis until the load-flow analysis indicates that all nodes on the electrical distribution network would receive power within the predetermined limits.

11. An apparatus comprising:
processing circuitry; and
logic, at least partially implemented by the processing circuitry, the logic to:
receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receive a forecast for demand on the electrical distribution network; receive the model capacitor banks and model voltage regulators and determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

set all the model capacitor banks to their existing settings in the electrical distribution network;

determine a first set of potential settings based on all the model capacitor banks being set to their existing settings; set all the model capacitor banks to an on setting within the model;

determine a second set of potential settings based on all the model capacitor banks being set to the on setting; set all the model capacitor banks to an off setting within the model;

determine a third set of potential settings based on all the model capacitor banks being set to the off setting; and select one of the first set of potential settings, second set of potential settings, and third set of potential settings.

12. An apparatus comprising:
processing circuitry; and logic, at least partially implemented by the processing circuitry, the logic to:

receive a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receive a forecast for demand on the electrical distribution network;

receive the model capacitor banks and model voltage regulators and determine one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

to perform a load-flow analysis based on the model, the forecast, and the potential settings for the model voltage regulators;

determine that the load-flow analysis indicates that reactive power would flow back towards the source; and modify the potential settings for the model voltage regulators to prevent reactive power from flowing back towards the source.

13. The apparatus of any one of claims 10, 11, and 12, wherein the nodes are divided into sections corresponding to portions of the electrical distribution network between voltage regulators.

14. The apparatus of claim 13, wherein the determined one or more settings are to reduce power usage, further comprising: the logic to move tap settings of the model voltage regulators down to decrease voltage in each of the sections.

15. The apparatus of claim 13, wherein the determined one or more settings are to reduce power loss, further comprising: the logic to adjust tap settings of the voltage regulator for each section according to load characteristics for the section.

16. The apparatus of claim 15, wherein tap settings for a voltage regulator are increased when constant power dominates the section.

17. The apparatus of claim 15, wherein tap settings for a voltage regulator are decreased when constant impedance dominates the section.

18. The apparatus of any one of claims 10, 11, and 12 further comprising: the logic optimization to use a mixed-integer non-linear optimization problem solver to refine the determined potential settings.

19. A computer-implemented method comprising:

receiving a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receiving one or more existing settings for the multiple capacitor banks and multiple voltage regulators of the electrical distribution network;

receiving a forecast for demand on the electrical distribution network;

determining, by circuitry, one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

performing a load-flow analysis based on the model, the forecast, and the potential settings for the model voltage regulators;

determining that the load-flow analysis indicates that at least one node on the electrical distribution network would receive power outside the predetermined limits; and adjusting the potential settings and testing the adjusted potential settings using the load-flow analysis until the load-flow analysis based on each adjustment of the potential settings indicates that all nodes on the electrical distribution network would receive power within the predetermined limits.

20. A computer-implemented method comprising:

receiving a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receiving one or more existing settings for the multiple capacitor banks and multiple voltage regulators of the electrical distribution network;

receiving a forecast for demand on the electrical distribution network;

determining, by circuitry, one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

setting all the model capacitor banks to their existing settings in the electrical distribution network;

determining a first set of potential settings based on all the model capacitor banks being set to their existing settings;

setting all the model capacitor banks to an on setting within the model;

determining a second set of potential settings based on all the model capacitor banks being set to the on setting;

setting all the model capacitor banks to an off setting within the model;

determining a third set of potential settings based on all the model capacitor banks being set to the off setting; and selecting one of the first set of potential settings, second set of potential settings, and third set of potential settings.

21. A computer-implemented method comprising:

receiving a model of an electrical distribution network having multiple capacitor banks and multiple voltage regulators, each of the multiple capacitor banks represented in the model by a model capacitor bank, each of the multiple voltage regulators represented in the model by a model voltage regulator, the electrical distribution network having a radial layout in which power flows from a source to multiple nodes in which each node is associated with one voltage regulator;

receiving one or more existing settings for the multiple capacitor banks and multiple voltage regulators of the electrical distribution network;

receiving a forecast for demand on the electrical distribution network;

determining, by circuitry, one or more settings for the multiple capacitor banks and multiple voltage regulators that allow for providing power within predetermined limits while reducing power loss as compared to a power loss of existing settings or reducing power usage as compared to a power usage of the existing settings, the one or more settings for the multiple voltage regulators determined according to a heuristic in which potential settings are iteratively determined for each of the model voltage regulators based on a least squares model of load flow analysis;

performing a load-flow analysis based on the model, the forecast, and the potential settings for the model voltage regulators;

determining that the load-flow analysis indicates that reactive power would flow back towards the source; and modifying the potential settings for the model voltage regulators to prevent reactive power from flowing back towards the source.

22. The method of any one of claims 19, 20, and 21, wherein the nodes are divided into sections corresponding to portions of the electrical distribution network between voltage regulators.

23. The method of claim 22, wherein the determined one or more settings are to reduce power usage, further comprising: moving tap settings of the model voltage regulators down to decrease voltage in each of the sections.

24. The method of claim 22, wherein the determined one or more settings are to reduce power loss, further comprising: adjusting tap settings of the voltage regulator for each section according to load characteristics for the section.

25. The method of claim 24, wherein tap settings for a voltage regulator are increased when constant power dominates the section.

26. The method of claim 24, wherein tap settings for a voltage regulator are decreased when constant impedance dominates the section.

27. The method of any one of claims 19, 20, and 21, further comprising: using a mixed-integer non-linear optimization problem solver to refine the determined potential settings.

* * * * *